No. 642,635.　　　　　　　　　　　　　Patented Feb. 6, 1900.
J. S. SHRAWDER.
DUMPING WAGON.
(Application filed June 10, 1899.)

(No Model.)　　　　　　　　　　　　　　2 Sheets—Sheet 1.

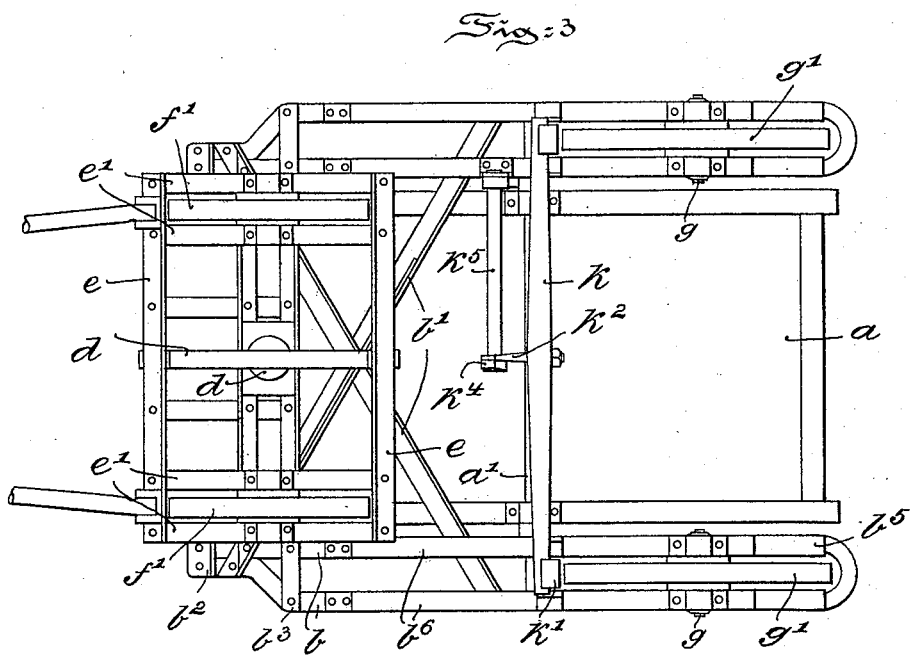
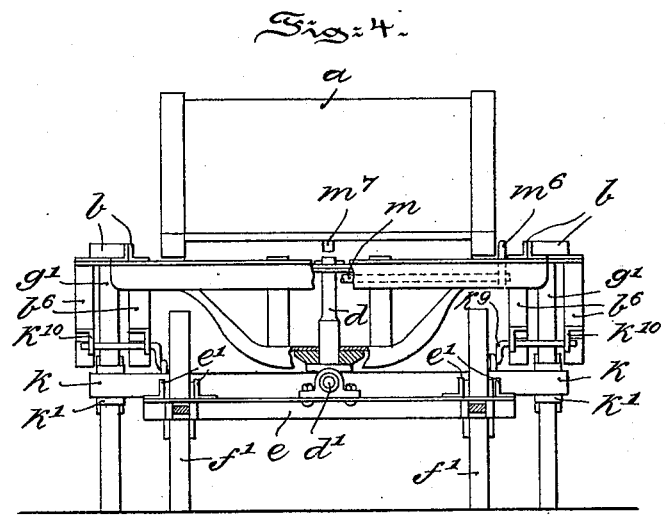
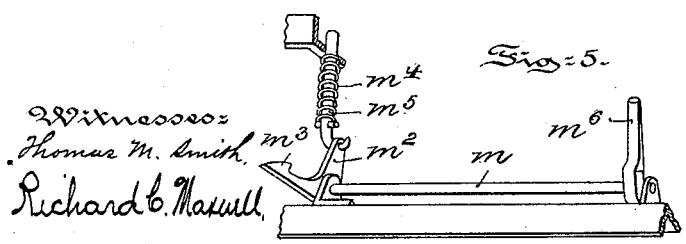

UNITED STATES PATENT OFFICE.

JOHN S. SHRAWDER, OF COLLEGEVILLE, PENNSYLVANIA.

DUMPING-WAGON.

SPECIFICATION forming part of Letters Patent No. 642,635, dated February 6, 1900.

Application filed June 10, 1899. Serial No. 720,059. (No model.)

*To all whom it may concern:*

Be it known that I, JOHN S. SHRAWDER, a citizen of the United States, residing at Collegeville, in the county of Montgomery and State of Pennsylvania, have invented certain new and useful Improvements in Dumping-Wagons, of which the following is a specification.

My invention has relation to a dumping-wagon of that type in which the frame and body of the vehicle are supported upon four wheels, and in such connection it relates more particularly to the construction and arrangement of such a vehicle.

The principal object of my invention is to provide a four-wheeled dumping-wagon of comparatively simple and inexpensive construction and which shall be strong, durable, and easy of manipulation.

To this end my invention consists, first, in providing in a four-wheeled dumping-wagon a front truck comprising a substantially rectangular frame having double sides which form the bearings for the axle of each front wheel; second, to provide, in connection with the front truck, a main truck supported above the front truck to constitute a support for the wagon-body, said main truck extending rearwardly on each side of the wagon-body and projecting downwardly at its rear end to constitute the bearings for the axles of the rear wheels; third, to provide in such a vehicle, in conjunction with the front and main trucks, a king-bolt of substantially inverted-T shape, the two members of which king-bolt being respectively swiveled to the main and to the front truck; fourth, to provide in such a vehicle, in conjunction with the main truck, a brake mechanism for the rear wheels of peculiar construction and arrangement, and, fifth, to provide in such a vehicle, in conjunction with the main truck and the body of the vehicle swiveled thereto, a locking and releasing mechanism of peculiar construction for connecting and disconnecting the body to or from the main truck.

My invention, stated in general terms, further consists of a dumping-wagon constructed and arranged in substantially the manner hereinafter described and claimed.

The nature and scope of my invention will be more fully understood from the following description, taken in connection with the accompanying drawings, forming a part hereof, in which—

Figure 1:
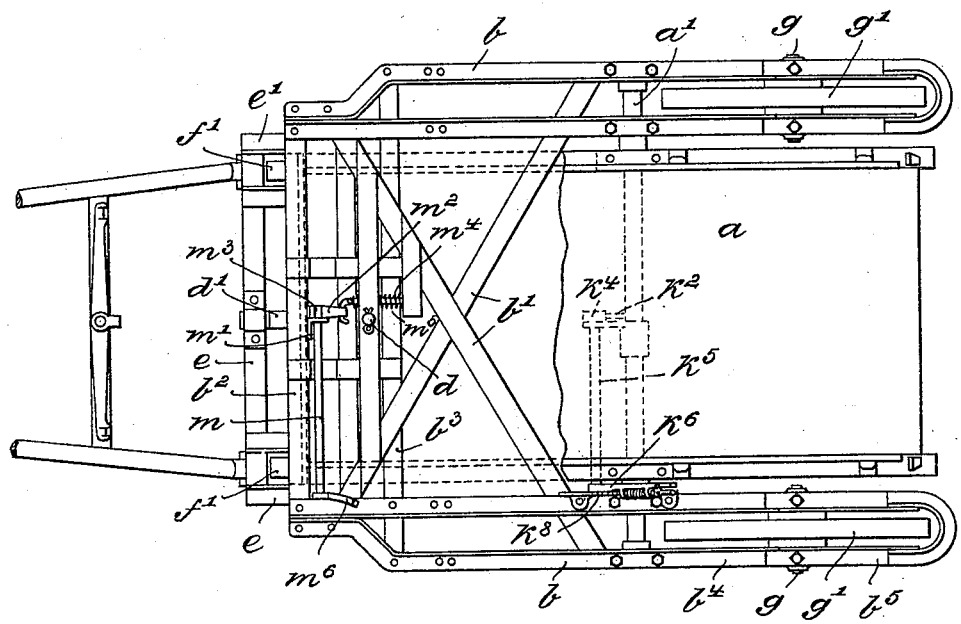
Figure 2:
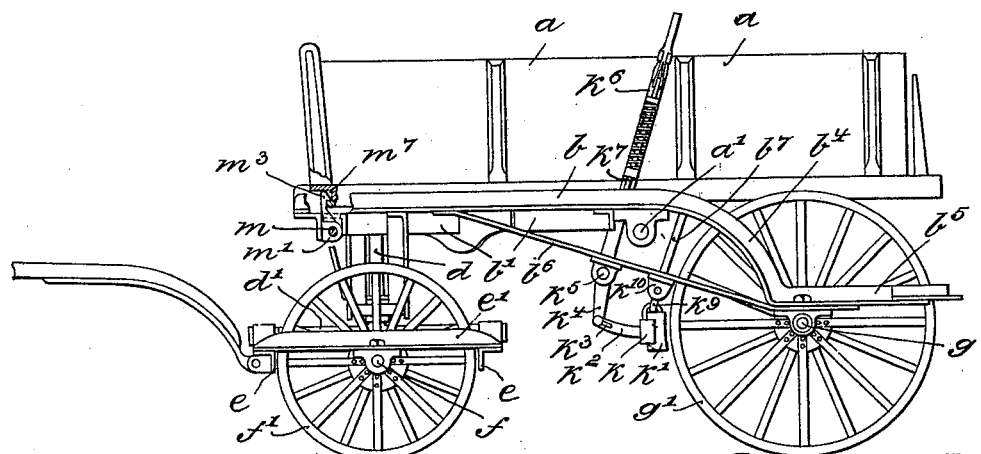

Figure 1 is a top or plan view of a dumping-wagon embodying the main features of my invention, the body of the vehicle being partly broken away to more clearly illustrate the construction and arrangement of the main truck. Fig. 2 is a side elevational view of Fig. 1, partly sectioned and broken away. Fig. 3 is an underneath plan view of the vehicle. Fig. 4 is a front elevational view of the vehicle, partly sectioned; and Fig. 5 is an enlarged perspective view illustrating the locking and releasing mechanism.

Referring to the drawings, $a$ represents the body of the vehicle, swiveled upon a shaft $a'$, which is supported in the double side frames $b\ b$ of the main truck. The frames $b\ b$ are connected together by means of the shaft $a'$, the diagonal braces $b'$, and the two cross-bars $b^2$ and $b^3$, located below the front end of the vehicle. Depending from the front end of the main truck are two substantially U-shaped brackets forming the bearing for the vertically-disposed member $d$ of a substantially inverted-T-shaped king-bolt. To the horizontal member $d'$ of this king-bolt a rectangular-shaped front truck is swiveled. This truck is formed of the side bars $e\ e$, connected at either end by double end bars $e'\ e'$, which bars form, respectively, the bearings or supports for each axle $f\ f$ of the front wheels $f'\ f'$.

From the above description it will be understood that the front truck, together with the wheels $f'\ f'$, can be turned beneath the body either with the vertical member $d$ or the horizontal member $d'$ of the king-bolt as a fulcrum. The truck and wheels can therefore either swing in a horizontal plane beneath the wagon-body or oscillate in a vertical plane toward and away from the wagon-body. The double side frames $b\ b$ of the main truck extend backward in a horizontal plane to a point beyond the shaft $a'$, to which the wagon-body is swiveled, and they are then downwardly bent, as at $b^4$, and thereafter again bent into a horizontal plane, the horizontal lower portion $b^5$ of which constitutes the bearings for the axles $g\ g$ of the rear wheels $g'\ g'$ of the vehicle. The two horizontal portions $b$ $b$ and $b^5$ $b^5$ are connected together by suitable spanners or braces $b^6$ $b^6$, from which extend the bolts or rods $b^7$ $b^7$ to the bent or curved portions $b^4$ of the side frames.

The brake mechanism for the rear wheels $g'$ $g'$ comprises a brake-beam $k$, having at either end a brake-shoe $k'$, adapted to be pressed against the tires of the wheels $g'$ $g'$. Intermediate of the ends of the beam $k$ extends an arm $k^2$, slottedly connected, as at $k^3$, with a crank $k^4$, depending from the transverse brake-shaft $k^5$. The shaft $k^5$ is preferably supported below the spanners or bracers $b^6$ $b^6$ and is operated by a handle $k^6$, having a spring-controlled catch $k^7$, adapted to engage in the notches of a quadrant-plate $k^8$ to lock the handle in required position. The brake-beam $k$ is swung at either end upon the hooks $k^9$, swinging loosely in bearings $k^{10}$, depending from the spanners or braces $b^6$.

The locking and releasing mechanism by means of which the body $a$ of the wagon is secured to or released from the main truck of the vehicle consists of a transverse shaft $m$, adapted to oscillate or rock in bearings $m'$, depending from the front end of the main truck between the two cross-bars $b^2$ and $b^3$. On the shaft $m$ is secured a catch or latch $m^2$, having its hook end $m^3$ normally elevated under the tension of a spring $m^4$, which tends normally through a pin $m^5$ to depress the other end of the catch $m^2$. The shaft $m$ is provided with a handle $m^6$, by means of which it may be turned to throw the hook end $m^3$ of the catch $m^2$ either up or down. The front end of the wagon-body is provided with a notch or recess $m^7$, into which the hook end $m^3$ of the catch $m^2$ is adapted to enter to lock the body down upon the main truck. When the catch is released from the recess or notch $m^7$, the body $a$ is readily swung upon the shaft $a'$ until its contents are discharged from the depressed rear end of the body. The rear portion of the body is permitted to swing down between the side frames of the main truck and the two rear wheels.

Having thus described the nature and objects of my invention, what I claim as new, and desire to secure by Letters Patent, is—

1. In a four-wheel dumping-wagon, a front truck, comprising a substantially rectangular frame having double sides to form the bearings for the axles of the front wheels, substantially as and for the purposes described.

2. In a four-wheel dumping-wagon, a main truck upon which the body of the vehicle is swiveled and supported and comprising two double side frames arranged outside the wagon-body and extending downwardly and horizontally at the rear ends to constitute bearings for the axles of the rear wheels, substantially as and for the purposes described.

3. In a four-wheel dumping-wagon, a body, a main truck to which the body is swiveled and comprising two double side frames extending horizontally along the sides of the body and projecting downwardly to form bearings for the rear wheels, a front truck located below the front end of the main truck and forming bearings for the front wheels, and a substantially inverted-T-shaped king-bolt connecting the main truck and front trucks together, the front truck and wheels being swiveled to the main truck with the king-bolt as a fulcrum so that said front truck may turn in a horizontal plane below the main truck and in a vertical plane toward or away from the main truck, substantially as and for the purposes described.

4. In a four-wheel dumping-wagon, a body, a main truck to which said body is swiveled, a transverse shaft adapted to be oscillated or rocked in bearings depending from the front end of said main truck, a catch secured on said shaft and having its hooked end normally elevated under the tension of a spring tending through a pin to depress the other end of said catch, a handle connected with said shaft and adapted to turn the same to throw the hooked end of said catch either up or down and the front end of said body being provided with a notch or recess into which the hooked end of said catch is adapted to enter to lock said body down upon said main truck, substantially as and for the purposes described.

5. In a four-wheel dumping-wagon, a wagon-body, a main truck upon which said body is supported and comprising two double side frames arranged outside of said wagon-body and forming the bearings for the axles of the rear wheels thereof, said frames connected together by means of a shaft, two diagonal braces and cross-bars and located below the front portion of said body, whereby is prevented torsional strain upon said truck in the action of the wagon, substantially as and for the purposes described.

In testimony whereof I have hereunto set my signature in the presence of two subscribing witnesses.

JOHN S. SHRAWDER.

Witnesses:
J. WALTER DOUGLASS,
THOMAS M. SMITH.